United States Patent
Jones et al.

(10) Patent No.: US 8,310,076 B2
(45) Date of Patent: Nov. 13, 2012

(54) GEARLESS TURBO-GENERATOR

(75) Inventors: Anthony C. Jones, San Diego, CA (US); Charles Beecroft, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 490 days.

(21) Appl. No.: 12/579,709

(22) Filed: Oct. 15, 2009

(65) Prior Publication Data

US 2011/0089691 A1    Apr. 21, 2011

(51) Int. Cl.
*F01D 15/10* (2006.01)
*F02C 6/00* (2006.01)
*H02K 7/18* (2006.01)
*H02P 9/04* (2006.01)

(52) U.S. Cl. ........................................................ 290/52
(58) Field of Classification Search .................... 290/52; 60/785
See application file for complete search history.

(56) References Cited

U.S. PATENT DOCUMENTS

| | | | |
|---|---|---|---|
| 3,965,673 A * | 6/1976 | Friedrich | 60/788 |
| 4,370,560 A | 1/1983 | Faulkner et al. | |
| 4,916,893 A | 4/1990 | Rodgers | |
| 5,235,803 A | 8/1993 | Rodgers | |
| 5,635,768 A | 6/1997 | Birch et al. | |
| 6,278,262 B1 | 8/2001 | Ullyott | |
| 6,735,951 B2 | 5/2004 | Thompson | |
| 6,777,822 B1 | 8/2004 | Suttie et al. | |
| 7,251,942 B2 | 8/2007 | Dittmar et al. | |
| 7,364,116 B2 | 4/2008 | Nguyen et al. | |
| 7,367,193 B1 | 5/2008 | Thompson | |
| 2005/0284150 A1 * | 12/2005 | Dittmar et al. | 60/788 |

* cited by examiner

*Primary Examiner* — Javaid Nasri
(74) *Attorney, Agent, or Firm* — Carlson, Gaskey & Olds, P.C.

(57) ABSTRACT

An auxiliary power unit includes a gas generator that produces a flow of gases to drive a free power turbine that directly drives an electric generator. The electric generator is driven by the free power turbine at a desired speed without the use of step down gearing to provide a lighter weight and more cost effective electric power generating system.

18 Claims, 2 Drawing Sheets

GEARLESS TURBO-GENERATOR

BACKGROUND

This disclosure generally relates to an auxiliary power unit. More particularly, this disclosure relates to an auxiliary power unit that includes a gas generator that drives an electric generator through a free power turbine.

Aircraft typically utilize an auxiliary power unit to provide electrical power to various systems when the main propulsion engines are not running. An auxiliary power unit typically includes a gas turbine engine that drives a generator through a gear train assembly. The gear train assembly is required as the optimal speed of the gas turbine engine is typically different than the optimal speed of the generator.

SUMMARY

A disclosed example auxiliary power unit includes a gas generator that produces a flow of gases to drive a free power turbine that directly drives an electric generator. The electric generator is driven by the free power turbine at a desired speed without the use of step down gearing to provide a lighter weight and more cost effective electric power generating system.

The electric generator includes a shaft to which the free power turbine is mounted. Power to drive the free power turbine is provided by a flow of gases produced by the gas generator. The example gas generator includes a compressor that compresses air supplied to a combustor. The compressed air is mixed with fuel and ignited to produce the desired flow of gases. A turbine is powered by the flow of gases and drives the compressor through a shaft. The free power turbine rotates separate from the gas generator and at a speed determined to provide the desired generation of power from the electric generator.

The example electric generator may be operated at a fixed speed, with the gas generator varying in speed responsive to the electric load to maintain the desired fixed speed. Alternatively, the electric generator can operate at various speeds that change responsive to the electric load. In either case, the gas generator changes speeds during operation to maintain power generation responsive to the electric load.

Because the gas generator operates at speeds greater than the generator and has a practical lower limit, instances may arise where the lowest speed of the gas generator would still drive the electric generator at speed greater than desired. Therefore, a bypass valve is provided to reduce flow to the power turbine and prevent rotation of the electric generator at speeds beyond desired operational limits.

Accordingly, the disclosed example auxiliary power unit utilizes a free power turbine to drive an electric generator without the weight and complexity that accompany a step down gear drive mechanism. Further, the example disclosed auxiliary power units utilizes a free power turbine to drive an electric generator such that optimal speeds of both the gas generator and the electric generator can be maintained throughout the range of electric loads and gas generator speeds.

These and other features disclosed herein can be best understood from the following specification and drawings, the following of which is a brief description.

DETAILED DESCRIPTION

Figure 1:
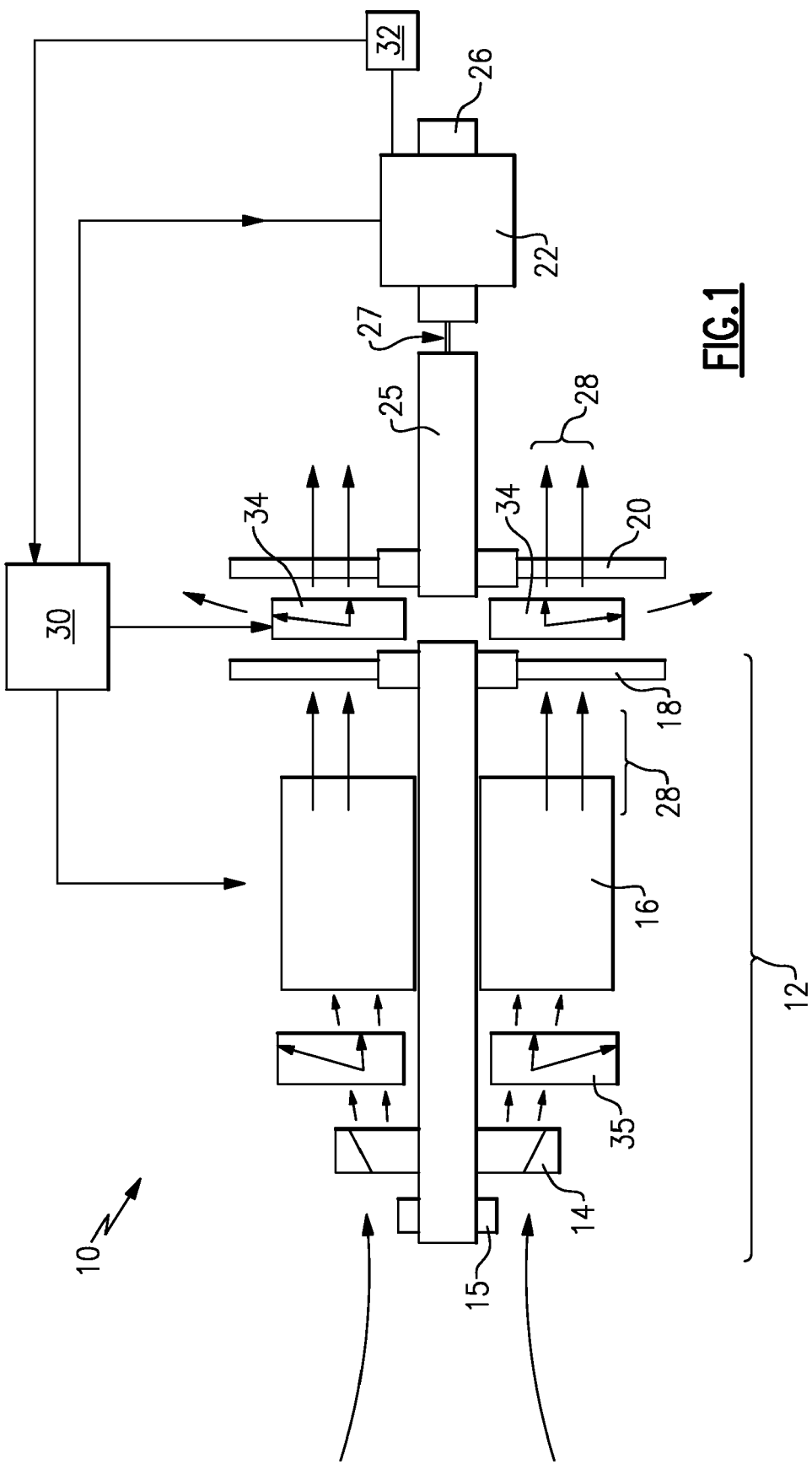
FIG. 1 is a schematic illustration of an example auxiliary power unit with a free power turbine driving an electric generator.

Referring to FIG. 1, an auxiliary power unit is schematically shown at 10 and includes a gas generator 12 that produces a flow of gases 28 that drives a free power turbine 20 that directly drives an electric generator 22. The electric generator 22 is driven by the free power turbine 20 at a desired speed without the use of step down gearing to provide a lighter weight and more cost effective electric power generating system.

The electric generator 22 includes a shaft 26 that drives shaft 25 through a coupler 27. The coupler 27 provides a driven connection between the shaft 26 of the electric generator 22 and the shaft 25 on which the free power turbine 20 is mounted. The coupler 27 provides a connection between the shafts 25 and 26 that accommodates misalignment therebetween. Power to drive the free power turbine 20 is provided by a flow of gases produced by the gas generator 12. The example gas generator 12 includes a compressor 14 that compresses air supplied to a combustor 16. In the combustor 16, the compressed air is mixed with fuel and ignited to produce the desired flow of gases. A turbine 18 is powered by the flow of gases and drives the compressor 14 through a shaft 24 as is commonly known. A starter 15 is engaged to the shaft 24 for starting the gas generator 12.

The specific configuration of the compressor 14, combustor 16 and turbine 18 can vary as needed to produce the desired flow of gases necessary to drive the free power turbine 20 at a desired speed, under a given electric load. The example compressor 14 is an axial compressor and can include multiple stages to provide the desired amount and character of compressed air. The combustor 16 may be of any configuration including axial, annular, and any other known configuration that provides the desired production of gases to drive both the turbine 18 and the free power turbine 20.

The example electric generator 22 can be of any known configuration to produce a desired quantity and character of electric power. For example the example electric generator 22 can be a synchronous wound field generator for producing high voltage alternating current. However, other electric generator configurations such as a permanent magnet induction or switched reluctance configuration can also be utilized with the example auxiliary power unit. Moreover, although one electric generator 22 is shown, several electric generators 22 could be driven by the shaft 25 in any known combination to produce a required amount of electric energy.

The free power turbine 20 rotates at a speed determined to provide the desired generation of power from the electric generator 22. The speed of the example turbine 18 is greater than that of the free power turbine 20. The example gas generator 12 operates at speeds in the range of between 30,000 to 60,000 rpm. The example electric generator 22 operates at a desired speed up to 24,000 rpm. The difference in the operational speed between the gas generator 12 and the electric generator 22 is provided by the configuration of the free power turbine 20. The free power turbine 20 rotates independent and separate from the gas generator 12.

The configuration of the free power turbine 20 provides for rotation and desired speed for the electric generator 22 in response to the same gas flow 28 that drives the first turbine 18 at the higher speeds required by the gas generator 12. The combination of providing the optimal speed for performance of the gas generator 12 and for the electric generator 22 provides for an increased efficiency in converting energy from the fuel fed to the gas generator into electric power by the electric generator.

The disparity in speed between desired operation of the gas generator 12 and the electric generator 22 is provided by the proportional rotation of the free power turbine 20 as compared to the shaft 24 and the first turbine 18. In other words, the free power turbine 20 is configured to convert the flow of gases 28 into a lesser rotational speed, than that of the first turbine 18 of the gas generator 12. The example free power turbine 20 therefore rotates at a fraction, or some proportion of the speed of the first turbine 18.

The use of the free power turbine 20 to drive the electric generator 22 at a speed much less than the speed of the gas generator eliminates the need for a step down gear drive mechanism and all the corresponding systems that are necessary to support such a gear drive mechanism. The resulting example auxiliary power unit 10 can therefore be constructed without the weight and complexity associated with step down gear drive mechanism.

During operation of the example auxiliary power unit 10, electric loads on the electric generator 22 will vary, thereby necessitating changes in power produced by the gas generator 12. The gas generator 12 will produce additional power by speeding up in response to increased demand on the electric generator, and will decrease in speed responsive to a decrease in demand on the electric generator 22. The example gas generator 12 is therefore configured to operate with low rotational inertia to provide for responsive speed changes dependent on electrical load on the electric generator 22.

The upper limit of operation of the gas generator 12 provides for optimal generation of electric energy from the electric generator 22 at the highest expected electrical loads. These speeds are provided by the configuration of the free power turbine 20 to convert the flow of gases into the desired rotational speed of the electric generator 12. Conversely, the lowest loads on the electric generator 22 require a correspondingly low speed of the gas generator 12. The gas generator 12 has a practical limit on how low a rotational speed can be sustained without disrupting operation. Therefore, the example auxiliary power unit 10 includes a bypass valve 34 that dumps gas flow 28 away from the power turbine 20 to reduce the amount and pressure of gas flow on the power turbine 20. The reduction of gas flow and pressure on the power turbine 20 maintains operation of the electric generator 22 within a desires rotational speed range.

Additionally, another bypass valve 35 can be utilized between the compressor 14 and the combustor 16 to direct air flow around the combustor 16. Reducing the airflow into the combustor 16 reduces the capacity of gas flow and pressure that can be produced by the combustor 16. This provides the desired reduction in pressure and gas flow to the power turbine 20. The example gas generator 12 includes both the bypass valve 34 between the driven turbine 18 and the free power turbine 20, and the bypass valve 35 before the combustor 16. Both or either one of the bypass valves 34 and 35 can be utilized to provide a desired function of the gas generator 12.

As appreciated, operation of the electric generator 22 can be maintained at a constant speed by further governing gas flow and pressure that drives the power turbine 20, along with varying the speed of the gas generator 12. The electric generator 22 can also be rotated at various speeds corresponding with changes in the required load by varying in a manner resulting in optimal power conversion for a given electric load.

A controller 30 governs operation of the example auxiliary power unit 10 and receives information from various sources including an indication of current electric load on the electric generator 22. Other information such as anticipated electric load can also be communicated to the controller 30. The controller 30 provides for changes in gas generator operation responsive to current and anticipated electric loads.

The example electric generator 22 can be operated at a fixed speed, with the gas generator 12 varying in speed responsive to the electric load to maintain the desired fixed speed. Alternatively, the electric generator 22 can operate at various speeds that change responsive to the electric load. In either case, the gas generator 12 changes speeds during operation to maintain power generation responsive to the electric load.

The process of operating the gas generator 12 to provide the desired production of electrical energy begins with sensing the current electric load on the electric generator 22. The load on the electric generator 22 may be steady, increasing or decreasing. As appreciated, adjustments are not required once the auxiliary power unit 10 is operating in a steady state. However, adjustments to the speed of the gas generator 12 are required responsive to increases or decreases in electric load.

In response to an increase to an electric load, the controller 30 commands an increase in speed from the gas generator 12 to produce higher pressures and greater flow of gases. The increase in operation is provided as understood by increasing gas input or any other known means. The speed of the gas generator 12 is increased to match the electric load on the generator 22. The speed required responsive to a given electric load can be known such that the controller 30 drives the gas generator to a speed known to provide the desired electric load. Alternatively, the controller 30 can steadily increase the speed of the gas generator 12 until the electric power produced by the electric generator 22 matches the demand.

The rate at which the speed of the gas generator 12 is increased can also be varied as desired to either steadily increase in desired increments until the power output matches demand, or can be increased quickly to essentially immediately provide the power required to generate the electric power.

Similarly, the speed of the gas generator 12 can be reduced responsive to a reduction in load on the electric generator 22. The reduction can be step wise or gradual in response to normal operation. The decrease may also be sudden, such as in response to an unexpected drop in power demand. Because the gas generator 12 operates at speeds greater than the generator 22 and has a practical lower limit, instances may arise where the lowest speed of the gas generator 12 would still drive the electric generator 22 at speed greater than desired. In such instances, the controller 30 actuates one of the bypass valves 34, 35 to direct gas flow away from the power turbine 20 to prevent over-rotating the electric generator 22 beyond desired operational limits. Actuation of the bypass valves 34, 35 reduces the pressure and flow of gases driving the free power turbine 20 which in turn maintain rotation of the electric generator 22 within desired rotational speed ranges.

Operational requirements of the auxiliary power unit 10 can also be anticipated such that the speed of the gas generator 12 can be modified to provide the power required prior to the electric load being encountered by the electric generator 22. The controller 30 can be configured to communicate with other systems 32 drawing power from the electric generator 22 and anticipate power requirements based on a stored or learned operational protocols. For example, actuation of a certain sequence of events, such as for example during aircraft operation, initiation of take-off or landing can trigger the controller 30 to anticipate electric power demands and drive the gas generator 12 to operate as required to accommodate the upcoming demands for electric energy. As appreciated, the controller 30 can use many different know events to anticipate power demands and operate the gas generator 12 to fulfill the upcoming electrical energy demands.

Figure 2:
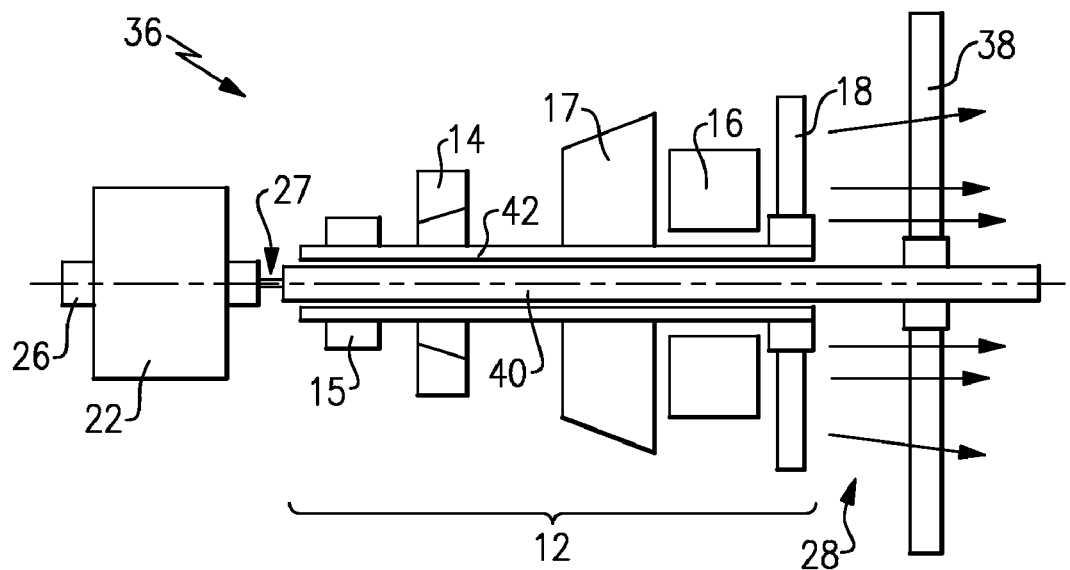
FIG. 2 is a schematic illustration of another example auxiliary power unit including a free power turbine driving an electric generator through a concentric cold end drive.

Referring to FIG. 2, another example auxiliary power unit 36 includes the generator 22 driven by a free power turbine 38 through shaft 40. The shaft 40 is disposed within a concentric shaft 42 of the gas generator 12. The example auxiliary power unit 36 provides a configuration known in the art as a concentric, cold end drive.

The auxiliary power unit 36 includes the axial compressor 14 along with a centrifugal compressor 17 that supplies compressed air to the combustor 16. Gases produced in the combustor 16 drives the turbine 18 of the gas generator 12. The example configuration provides for a reduction in overall size while providing the benefits of a gearless free power turbine electric power generation.

Figure 3:
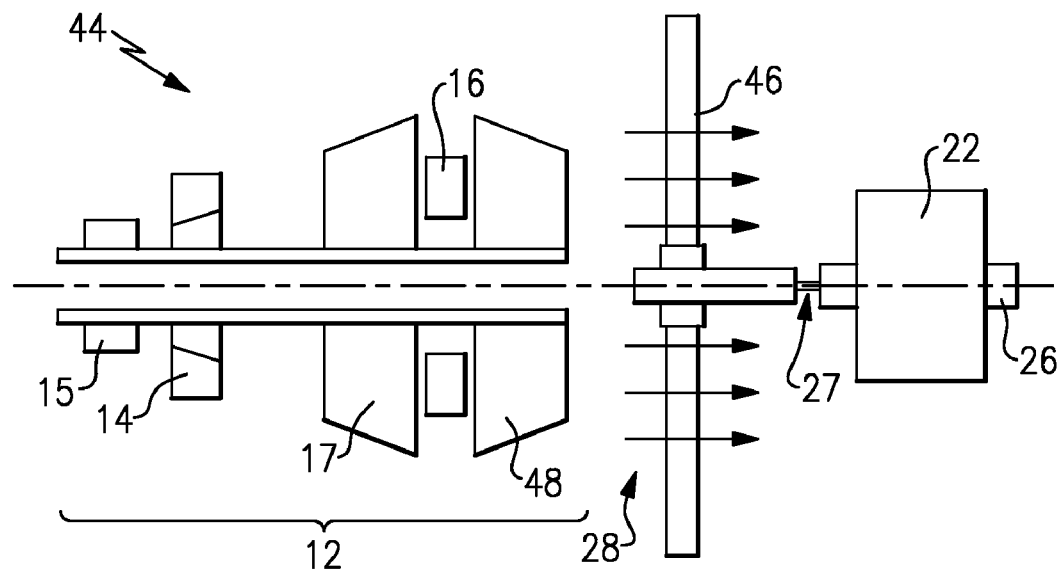
FIG. 3 is a schematic illustration of another example auxiliary power unit including a gas generator including a radial flow turbine.

Referring to FIG. 3, another example auxiliary power unit 44 is shown that includes a gas generator 12 that includes the axial compressor 14, the centrifugal compressor 17 that provide compressed air to the combustor 16 to drive the turbine 48. The example turbine 48 is a radial turbine. A free power turbine 46 is powered by the gas flow 28 as in the previously discussed configuration to drive the electric generator 22. The example auxiliary power unit 44 uses both the axial and radial compressors and is only one example of the how the disclosed example auxiliary power unit can be practiced using various combinations of known gas turbine engine architectures.

Each of the disclosed example auxiliary power units converts energy from fuel to electrical power without the weight and complexity that accompany a step down gear drive mechanism. Further, the example disclosed auxiliary power units utilize a free power turbine to directly drive an electric generator such that optimal speeds of both the gas generator and the electric generator can be maintained throughout the range of electric loads and gas generator speeds.

Although an example embodiment has been disclosed, a worker of ordinary skill in this art would recognize that certain modifications would come within the scope of this invention. For that reason, the following claims should be studied to determine the true scope and content of this invention.

What is claimed is:

1. An auxiliary power unit comprising:
    a gas generator including a compressor coupled to a first turbine and a combustor creating a flow of gases driving the first turbine;
    an electric generator for producing electrical energy; and
    a power turbine coupled to the electric generator and driven by the flow of gases generated by the combustor, the power turbine rotatable independent of the compressor and first turbine.

2. The auxiliary power unit as recited in claim 1, wherein, the first turbine is rotatable at a first speed and the power turbine is rotatable at a second speed different than the first speed.

3. The auxiliary power unit as recited in claim 1, wherein the power turbine is mounted to a shaft driving the electric generator.

4. The auxiliary power unit as recited in claim 1, including a controller controlling operation of the gas generator responsive to an electric load on the electric generator.

5. The auxiliary power unit as recited in claim 1, including a flow controller operable for controlling the flow of gases to the power turbine.

6. The auxiliary power unit as recited in claim 5, wherein the flow controller is operable to bypass at least a portion of the flow of gases that drive the power turbine responsive to an electric load on the electric generator.

7. An auxiliary power unit comprising:
    a gas generator including a compressor driven by a first turbine and a combustor that produces a flow of gases driving the first turbine;
    an electric generator generating electrical energy, the electric generator including a shaft rotatable independent of the first turbine; and
    a power turbine mounted to the electric generator shaft that drives rotation of the generator responsive to the flow of gases produced by the combustor, wherein the power turbine is rotatable independent of the compressor and first turbine.

8. The auxiliary power unit as recited in claim 7, wherein the power turbine rotates at a speed different then the first turbine of the gas generator.

9. The auxiliary power unit as recited in claim 7, wherein the power turbine is mounted to a shaft that drives the electric generator shaft such that a rotational speed of the shaft is the same as the rotational speed of the power turbine.

10. The auxiliary power unit as recited in claim 7, including a controller governing operation of the gas generator responsive to an electrical load on the electric generator, wherein the controller tailors power output of the gas generator to the electric load on the electric generator.

11. The auxiliary power unit as recited in claim 10, including a gas flow control device for controlling the flow of gases directed to drive the power turbine.

12. The auxiliary power unit as recited in claim 11, wherein the gas flow control device bypasses the flow of gases away from the power turbine to reduce a quantity of the gas flow available for driving the power turbine responsive to a determined drop in electric load on the electric generator.

13. The auxiliary power unit as recited in claim 7, wherein the electric generator is disposed on a cold end of the gas generator and through a concentric shaft driven by the power turbine.

14. A method of operating an auxiliary power unit including a gas generator driving an electric generator through a separately rotatable power turbine, the method comprising the steps of:
    driving a first turbine with gases generated by combustor, wherein the first turbine is coupled through a shaft to drive a compressor,
    driving the power turbine attached to the electric generator with the gases generated in the combustor such that the power turbine is rotatable independent of the first turbine;
    sensing an electric load on the electric generator; and
    changing power output by the gas generator responsive to the sensed electric load to tailor production of gases driving rotation of the power turbine to the sensed electric load to produce a desired speed of the electric generator.

15. The method as recited in claim 14, including the step of anticipating an electric load on the electric generator and changing power output by the gas generator in anticipation of the change in electric load.

16. The method as recited in claim 15, wherein the desired speed of the power turbine is constant for all electric loads.

17. The method as recited in claim 15, wherein the desired speed of the power turbine varies responsive to an electric load on the electric generator.

18. The method as recited in claim 14, including the step of routing at least a portion of the gas flow produced by the gas generator away from the power turbine to reduce pressure exerted on the power turbine.

* * * * *